United States Patent
Cruickshank

[19]

[11] Patent Number: 6,085,589
[45] Date of Patent: Jul. 11, 2000

[54] MATERIAL LEVEL SENSING SYSTEM CALIBRATION

[75] Inventor: William T. Cruickshank, Port Huron, Mich.

[73] Assignee: Venture Measurement Company LLC, Spartanburg, S.C.

[21] Appl. No.: 08/772,722

[22] Filed: Dec. 23, 1996

[51] Int. Cl.[7] ............................. G01F 23/00; G01F 25/00
[52] U.S. Cl. ........................ 73/290 R; 73/1.73; 73/290 V
[58] Field of Search .................................. 73/1.73, 290 R, 73/290 V; 324/642

[56] References Cited

U.S. PATENT DOCUMENTS

| | | | |
|---|---|---|---|
| 3,296,862 | 1/1967 | Ziniuk | 73/290 R |
| 3,853,005 | 12/1974 | Schendel | 73/290 R |
| 4,006,637 | 2/1977 | Kinosita | 73/290 R X |
| 4,531,406 | 7/1985 | Fritz | 73/290 R |
| 4,676,100 | 6/1987 | Eichberger | 73/304 C |
| 5,048,335 | 9/1991 | Marsh et al. | 73/304 C |
| 5,514,965 | 5/1996 | Westwood | 324/533 |
| 5,651,286 | 7/1997 | Champion et al. | 73/290 V |
| 5,672,975 | 9/1997 | Kielb et al. | 324/644 |
| 5,717,337 | 2/1998 | Kelly | 324/534 |
| 5,760,309 | 6/1998 | Maltby et al. | 73/290 V X |
| 5,884,231 | 3/1999 | Perdue et al. | 73/290 R X |

FOREIGN PATENT DOCUMENTS 4234300  4/1994  Germany .

OTHER PUBLICATIONS

Application Note HP54, "Improvements in Microwave Swept Frequency Techniques" pp. 1–6 Nov. 15, 1961.

Primary Examiner—Hezron Williams
Assistant Examiner—Willie Morris Worth
Attorney, Agent, or Firm—Reising, Ethington, Barnes, Kisselle, Learman & McCulloch, P.C.

[57] ABSTRACT

A system for measuring level of material in a vessel that includes a transmission line probe adapted to be positioned for contact with material in the vessel. Electronics are coupled to the transmission line probe for launching microwave radiation along the probe and detecting radiation reflected by the electrical impedance discontinuity presented at the air/material interface in the vessel. Level of the air/material interface within the vessel is determined employing time domain reflectometry techniques, and is displayed as a continuous function over a predetermined range. The system range is calibrated by means of a target selectively manually positionable along the probe rod while the probe is disposed outside of the vessel. First and second signals are selectively stored in the system electronics with the target disposed at positions along the probe rod corresponding to the ends of the material level measurement range. The electronics are thereafter operable to display level of the air/material interface along the probe within the vessel over the predetermined range between the selected positions of the target along the probe rod. The end of the probe rod is at an angle of 90° to the remainder of the probe to eliminate material level ambiguity at the probe end.

16 Claims, 2 Drawing Sheets

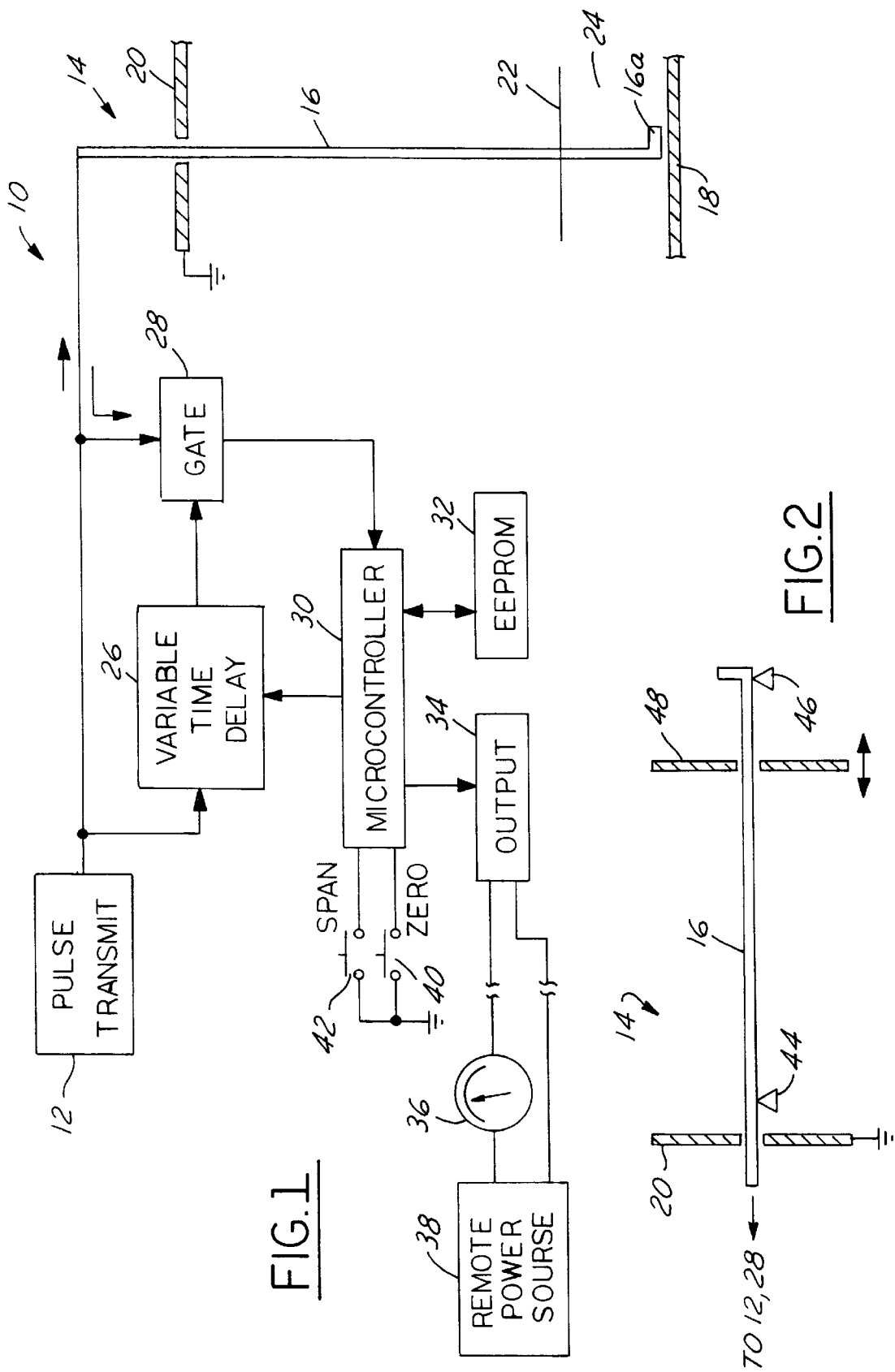

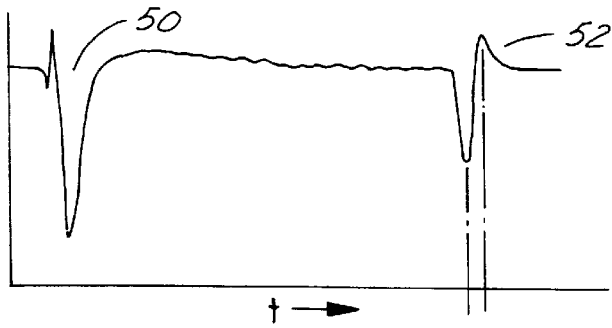
FIG.3A
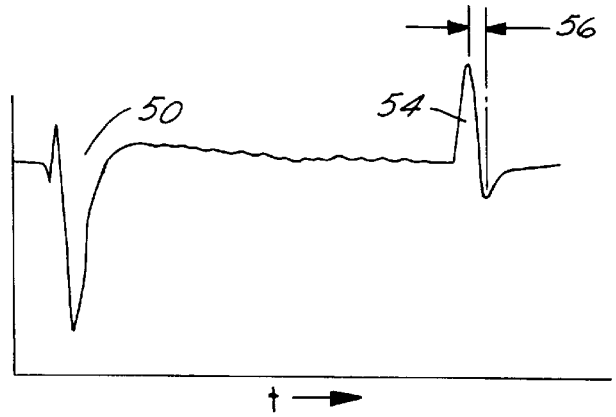
FIG.3B
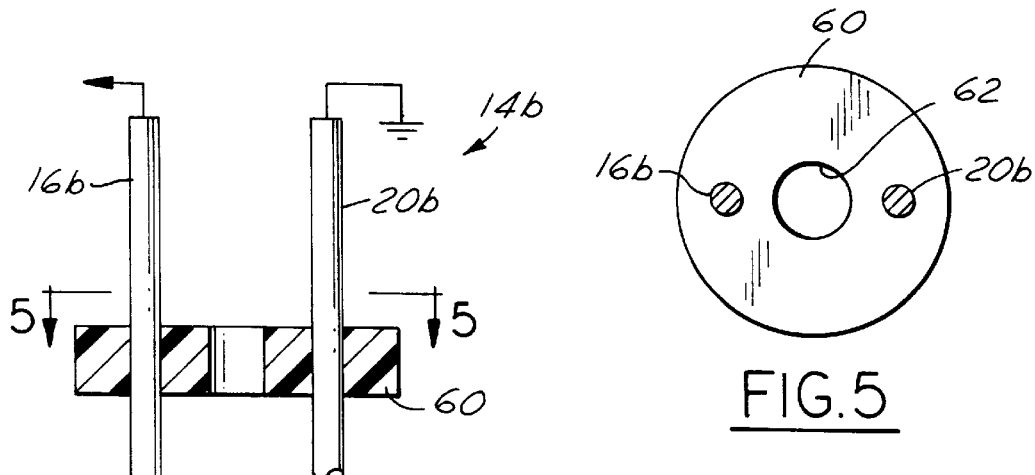
FIG.4
FIG.5
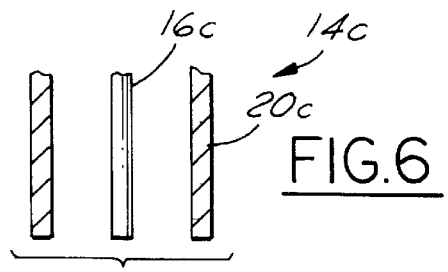
FIG.6
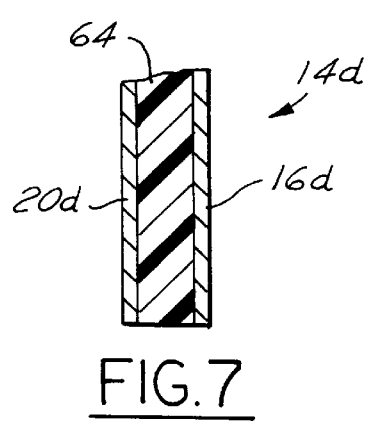
FIG.7

MATERIAL LEVEL SENSING SYSTEM CALIBRATION

The present invention is directed to detection of level of material in a storage vessel, and more particularly to a system and method for calibrating material level measurement between predetermined operating limits.

BACKGROUND AND OBJECTS OF THE INVENTION

It has heretofore been proposed to employ so-called time domain reflectometry techniques to detect level of material in a storage vessel. In general, this technique involves placement of a conductive transmission line probe in the vessel at an orientation to be contacted by material in the vessel. A microwave pulse of short duration is launched onto the transmission line probe, typically in a downward direction through air toward the material surface. When this pulse encounters an electrical discontinuity, such as the change in dielectric constant at the interface between the air and material, a portion of the pulse energy is reflected back along the transmission line probe to detection electronics. Time-delayed gating techniques are employed in a process referred to as equivalent time sampling to locate the position of the reflecting discontinuity along the transmission line probe, and thereby to determine level of the material surface with respect to the probe.

Although the material level sensing technique so described has overcome problems and difficulties theretofore extant in the art, further improvements remain desirable. For example, a problem with time domain reflectometry level measurement techniques lies in an ambiguity in level measurement at the free end of the transmission line probe. Specifically, it has been found that a phase reversal takes place in the signal reflected from the free end of the transmission line probe when the material just contacts the free end of the probe. This phase reversal causes the detection electronics to indicate a material level greater than actual material level. On the other hand, there is an opposite phase reversal in the reflected signal when the material just moves out of contact with the probe. Consequently, there is a zone of ambiguity, generally corresponding to transmission pulse length, at material levels near the end of the probe. In very short vessels, this zone of ambiguity can represent a significant percentage of overall height.

Numerous systems and techniques have heretofore been proposed for continuous measurement of material level within a storage vessel between preset or predetermined operating limits. For example, it is conventional practice to provide a material level-indicating output over a continuous current range of four to twenty milliamps corresponding to a material level range within the vessel between empty and full conditions. Insofar as applicant is aware, all of such systems require that the probe or other level-responsive means be placed within the vessel, and that the material be raised and lowered within the vessel between levels corresponding to the full and empty conditions in order to calibrate the range limits of the detection electronics.

It is a general object of the present invention to provide a material level measurement system and method, employing time domain reflectometry techniques or technology, with facility for calibration outside of the material vessel, such as at the time of manufacture or immediately prior to installation into a vessel. A more specific object of the present invention is to provide a system and method of the described character in which zero and span calibration, corresponding to the lower and upper ends of the continuous material level measurement range, can be calibrated by relatively unskilled personnel prior to installation in the vessel. A further specific object of the present invention is to provide a material level measurement system that employs time domain retlectometry techniques in which the transmission line probe is constructed to eliminate material level measurement ambiguity at the free end of the probe.

SUMMARY OF THE INVENTION

A system for measuring level of material in a vessel in accordance with a presently preferred embodiment of the invention includes a transmission line probe adapted to be positioned for contact with material in the vessel. Electronics are coupled to the transmission line probe for launching microwave radiation along the probe and detecting radiation reflected by the electrical impedance discontinuity presented at the air/material interface in the vessel. Level of the air/material interface within the vessel is determined employing time domain reflectometry techniques, and is displayed as a continuous function over a predetermined range. The system range is calibrated in accordance with one aspect of the present invention by means of a target selectively manually positionable along the probe while the probe is disposed outside of the vessel. First and second signals are selectively stored in the system electronics with the target disposed at positions along the probe corresponding to the respective ends or limits of the material level measurement range. The system electronics are thereafter operable to display level of the air/material interface along the probe within the vessel over the predetermined range between the selected limit positions of the target along the probe. In the preferred embodiment of the invention, the electronics are microprocessor-based and include non-volatile memory in which digital signals are stored corresponding to the target positions at opposed ends of the material level measurement range.

In accordance with a further aspect of the present invention, there is provided a method of calibrating a system for measuring level of material in a vessel, which includes an electrically conductive probe and electronics coupled to the probe for measuring level of material within the vessel over a preselected material level range. The method of calibration includes the steps of providing a target operatively coupled to the probe with the probe positioned outside of the vessel so as to simulate at the probe and the measurement electronics disposition of the air/material interface at both ends or limits of the measurement range, and storing signals in the measurement electronics indicative of disposition of the air/material interface at one or both ends of the range. In this way, the measurement electronics is thereafter calibrated to measure material level continuously over the level measurement range between the preset high and low limits of the range. In the preferred implementation of this calibration method, the high and low limits of the measurement range are each calibrated separately by positioning the target at one of the range limits and loading a corresponding material level signal into the measurement electronics. Alternatively, targets may be positioned simultaneously along the probe at both of the low and high material measurement limits, and corresponding signals stored in electronic memory in a single storage operation.

In accordance with yet another aspect of the present invention, which may be implemented separately from or more preferably in combination with other aspects of the invention, the transmission line probe is so constructed as to eliminate any ambiguity in level measurement when the air/material interface is at the free end of the probe. This is accomplished by constructing the probe in the form of an elongated rod having a free end bent or otherwise constructed at an angle of 90° with respect to the overall length of the probe rod. The length of the bent end preferably corresponds to velocity of propagation of microwave energy in air multiplied by to tall time duration of a microwave measurement pulse. This feature of the invention eliminates the phase-shift ambiguity otherwise associated with employing time domain reflectometry techniques with probes of this configuration.

BRIEF DESCRIPTION OF THE DRAWINGS

The invention, together with additional objects, features and advantages thereof, will be best understood from the following description, the appended claims and the accompanying drawings in which:

FIG. 1 is a functional block diagram of a material level measurement system in accordance with a presently preferred embodiment of the invention;

FIG. 2 is a schematic diagram that illustrates calibration of the system in FIG. 1;

FIGS. 3A and 3B are graphic figures that illustrate material level measurement ambiguity at the free end of the probe; and FIGS. 4–7 are fragmentary sectional views of alternative transmission line probe constructions in accordance with the present invention.

DETAILED DESCRIPTION OF PREFERRED EMBODIMENTS

FIG. 1 is a functional block diagram of a material level measurement system 10 in accordance with a presently preferred embodiment of the invention. A pulse transmitter 12 is connected to launch microwave pulses of short duration along a transmission line probe 14. Probe 14 includes an elongated electrically conductive rod 16 adapted to be disposed within a material vessel 18 so as to be contacted and surrounded by material as the material rises and falls within the vessel. Adjacent to the top of vessel 18, probe 14 includes a grounded launch plate 20 that surrounds probe rod 16. Pulsed microwave energy launched by transmitter 12 along probe rod 16 is partially reflected from electrical discontinuities along the probe, such as the upper level or interface 22 between air and material 24 within vessel 18.

Pulse transmitter 26 is also connected through a variable time delay 26 to a gate 28 that receives reflections from transmission line probe 14. The output of gate 28 is coupled to a microprocessor-based microcontroller 30, which controls operation of variable time delay 26. Microcontroller 30 is also connected to a non-volatile memory, such as an EEPROM 32, which stores control programming and other control parameters and information for microcontroller 30. Microcontroller 30 provides an output to an output buffer 34, which may provide a 4–20 mA output to a remote meter or gauge 36, such as by varying the amount of current drawn from a remote power source 38 that supplies power to system 10. Microcontroller 30 also receives inputs from a pair of switches 40, 42 for selectively calibrating the zero and span adjustments of microcontroller 30, as will be described.

In operation, pulse transmitter 12 transmits periodic microwave pulses of short time duration to transmission line probe 14. Variable time delay 26 is controlled by microcontroller 30 so as to operate gate 28, and thereby monitor for reflections, for brief time intervals at progressively increasing time delays from pulse transmission. This technique, commonly referred to as equivalent time sampling, effectively divides the length of transmission line probe 14 into a multiplicity of small discreet lengths that are monitored in sequence for reflections from any electrical discontinuity. Employing this technique, a reflection will be received from air/material interface 22, from which microcontroller 30 can determine the level of interface 22 with respect to the bottom of vessel 18 based upon the known overall length of transmission line probe 14 and the known overall height of material vessel 18. This material level information is output to buffer 34, which provides a corresponding material level reading at meter 36.

In accordance with one feature or aspect of the present invention, system 10 may be calibrated to provide the desired output over the desired material level measurement range before transmission line probe 14 is assembled to vessel 18. Referring to FIG. 2, probe 14, connected to the measurement electronics, is placed on a pair of spaced rests 44, 46, either at the manufacturing plant or in the field prior to installation within vessel 18. Rests 44, 46 preferably are constructed of non-conductive material and in such a way as to present minimal impedance discontinuity along the probe. A target 48, such as a slotted disc, is then positioned on probe rod 16, and is moved to a first position along the probe rod, such as immediately adjacent to the free end of the probe rod, that corresponds to the "zero" position or minimum measurable material level within the vessel. (Alternatively, the free end of the probe may be used as a "target" for calibrating the "zero" or low limit of the measurement range.) Pushbutton 40 is then depressed by the operator so as to activate microcontroller 30 and obtain from transmission line probe 14 a first signal indicative of this minimum material level position. This first signal is digitally stored in EEPROM 32. For single-conductor transmission line probes 14, a target 48 of conductive material produces stronger reflections than a target of non-conductive material, and is preferred. Non-conductive target material may be preferred for dual-line probes (FIGS. 4–7).

Target 38 is then positioned by the operator at a second position a long probe rod 16 corresponding to the maximum desired height of material within the vessel—i.e., the level of air/material interface 22 (FIG. 2) corresponding to a full vessel condition. Span pushbutton 42 is then depressed by the operator, and microcontroller 30 obtains and stores a second signal from transmission line probe 14 corresponding to the maximum desired material level. (It will be appreciated that, since the two measurements are entirely independent of each other, the calibration may be done in reverse sequence.) The first or minimum material level signal is employed by microcontroller 30 to generate the minimum material level output at meter 36 e.g., 4 mA. The second or maximum material level signal is employed by microcontroller 30 to generate the maximum level reading at meter 36 —e.g. 20 mA. Such readings may be observed by the operator to confirm calibration of the low and high level limits. Thereafter, with probe 14 installed in vessel 18, material levels between these calibration limits are automatically scaled by microcontroller 30 to provide a corresponding intermediate material level reading at meter 36. In the event of loss of "zero" and/or "span" calibration for any reason, the electronics may be recalibrated by raising and lowering material between the desired limits as is conventional in the art, or by removing the probe from the vessel and recalibrating as discussed above.

Another technique may be implemented at this calibration stage to improve accuracy of the measurement process. In some applications, it has been found that the baseline of the electrical signal (FIGS. 3A and 3B) can have substantial ripple or noise be and reliance and return. This signal noise can make detection of the actual return signal more difficult. To overcome this problem, the entire baseline signal can be digitized and stored in EEPROM 32 during the calibration process. Thereafter, during a measurement process, microcomputer 30 can subtract the stored signal from the actual signal. The baseline noise is thereby reduced or eliminated, the actual reflected energy pulse is highlighted, and overall system signal-to-noise ratio is greatly enhanced. Microcontroller 30 may also be programmed to perform a self-test operation in which the microcontroller continuously monitors for transmitted and return pulses, and interprets the absence of any return pulses during one cycle of time delay 26 as indicating a fault condition, such as may be associated for example with a broken transmission line probe.

When material just contacts the free end of transmission line probe rod 16, a phase reversal in the reflected signal occurs as illustrated in FIGS. 3A and 3B. FIG. 3A illustrates transmitted and reflected signals 50, 52 in a situation where material does not contact the free end of transmission line probe 16, while FIG. 3B illustrates transmitted and reflective signals 50, 54 when material just contacts the free end of the probe rod. It will be noted that there is a phase reversal as between reflected signals 52, 54, which results in a material level ambiguity corresponding to the time 56 of one pulse width. This material level ambiguity is equal in distance to pulse width 56 multiplied by the speed of pulse transmission along rod 16 surrounded by air, which for practical purposes is equal to the speed of light. For example, a pulse width of 200 picoseconds corresponds to a distance of 0.06 meters or about 2.4 inches. In order to overcome this ambiguity, the free end 16a of probe rod 16 is bent at an angle of 90° with respect to the remainder of the probe rod, with the length of the bend corresponding to one pulse width or 2.4 inches in this example. The bent free end of the probe rod effectively provides a 2.4 inch deadband in the material level measurement so that there is no material level ambiguity when the air/material interface just contacts or just loses contact with the probe rod.

It will thus be appreciated that the system and method of the present invention fully achieve all of the objects and aims previously set forth. Although the present invention has thus far been described in conjunction with a presently preferred embodiment thereof many modifications and variations may be implemented without departing from the principles of the invention in their broadest aspects. For example, although a single-line transmission line probe 14 is currently preferred as shown in FIGS. 1–2, other probe constructions can be employed. FIG. 4 shows a modified transmission line probe 14b that includes parallel probe lines 16b, 20b separated from each other by a dielectric spacer 60. Spacer 60 has a center opening 62 for admitting material 24 (FIG. 1) within spacer 60. Spacer 60 thereby presents a minimum electrical discontinuity in and of itself along the length of the transmission line probe, so that the transmission line probe can more readily be responsive to level of the air/material interface. (Even if spacer 60 presents a measurable impedance discontinuity, this discontinuity will remain in fixed position and can be "calibrated out" at microcontroller 30.) FIG. 6 illustrates a coaxial transmission line probe 14c that includes an inner conductor 16c surrounded by an outer conductor 20c. FIG. 7 illustrates a strip-line probe 14d having parallel probe conductors 16d, 20d deposited on opposite sides of a non-conductive base or substrate 64.

The system calibration technique in accordance with the present invention has been described in conjunction with calibration of the lower and upper material level limits, corresponding to the zero and span adjustment of the level detection electronics, as separate sequential steps as is currently preferred. However, because time delay reflectometry techniques are capable of identifying and distinguishing among multiple material interface levels, calibration of the upper and lower limits of the measurement range can be accomplished simultaneously by placing a pair of targets at positions along the probe corresponding to the upper and lower ends of the material level range, and executing a single calibration measurement at microcontroller 30. The microcontroller will first receive a reflection from the target positioned at the upper material level limit, and subsequently receive a second reflection from the target (which may be the probe end) positioned at the lower material level limit. These reflections can be readily distinguished, and corresponding material level measurement indications stored in EEPROM 32 for calibrating the material level and display range as previously described.

The zero and span calibration means are illustrated as manual pushbutton switches in FIG. 1, as is currently preferred. To calibrate the instrument, the operator may remove the instrument cover to expose switches 40, 42, and then proceed as described above. Alternatively, switches 40, 42 may comprise magnetic or optical switches that can be activated without removing the instrument cover, as disclosed in U.S. Pat. No. 5,048,335. Calibration may also be initiated remotely, as disclosed in U.S. Pat. No. 4,676,100, through a connector coupled to controller 30.

What is claimed is:

1. A system for measuring level of material in a vessel that comprises:
   a transmission line probe adapted to be positioned for contact with material in the vessel such that an impedance discontinuity is presented along said probe at the air/material interface in the vessel,
   means for launching microwave radiation along said probe such that a portion of such radiation is reflected from said impedance discontinuity,
   means responsive to said reflected energy portion for determining level of said air/material interface with respect to said probe employing time-domain reflectometry,
   means responsive to said level-determining means for displaying level of said interface as a continuous function over a predetermined range, and
   means for calibrating said displaying means to said predetermined range with said probe disposed outside of the vessel comprising target means for selective positioning along said probe to reflect microwave radiation, and means coupled to said level-determining means for storing at least one signal indicative of one end limit of said range when said target means is at a first position along said probe, said level-determining means thereafter cooperating with said displaying means to indicate level of the air/material interface along said probe over said predetermined range with respect to said one end limit of said range.

2. The system set forth in claim 1 wherein said means for storing said at least one signal comprises means for storing first and second signals at said level-determining means, with said probe disposed outside of the vessel, corresponding to first and second end limits of said range, at least said signal corresponding to said first end limit being generated by reflections from said target means on said probe.

3. The system set forth in claim 2 wherein said level-determining means comprises microprocessor-based means for determining interface level, said means for storing said first and second signals comprising means for storing digital indicia in said microprocessor-based means indicative of said first and second end limits of said range.

4. The system set forth in claim 3 wherein said microprocessor-based means comprises non-volatile memory in which said digital indicia is stored.

5. The system set forth in claim 4 wherein said means for storing said first and second signals comprises first and second switches operatively coupled to said microprocessor-based means.

6. The system set forth in claim 1 wherein said transmission line probe comprises a conductive-rod having a central axis and a free end disposed within said vessel, said free end being angulated with respect to said axis.

7. The system set forth in claim 6 wherein said free end is disposed at an angle of 90° with respect to said axis.

8. The system set forth in claim 7 wherein said microwave radiation is launched in pulses of predetermined width, and wherein the angulated free end has a length corresponding to one pulse width times the speed of light.

9. A system for measuring level of material in a vessel that comprises
   a transmission line probe adapted to be positioned for contact with material in the vessel such that an impedance discontinuity is presented along said probe at the air/material interface in the vessel,
   means for launching microwave radiation along said probe such that a portion of such radiation is reflected from said impedance discontinuity,
   means responsive to said reflected energy portion for determining level of said air/material interface with respect to said probe employing time-domain reflectometry,
   means responsive to said level-determining means for displaying level of said interface as a continuous function over a predetermined range, and
   means for calibrating said displaying means to said predetermined range comprising target means for selective manual positioning along said probe, with said probe disposed outside of the vessel, to reflect microwave radiation, first means coupled to said level-determining means for storing a first signal indicative of one end of said rang position said target means is at a first position along said probe, and second means coupled to said level-determining means for storing a second signal indicative of a second end of said range when said target means is at a second position along said probe, said level-determining means thereafter cooperating with said displaying means with said probe disposed in the vessel to indicate level of the air/material interface along with said probe over said predetermined range between said first and second positions along said probe.

10. A method of calibrating a system for measuring level of material in a vessel that includes an electrically conductive probe for positioning in the vessel, means coupled to said probe for developing electrical signals to determine level of the material within the vessel, and means for displaying level of the material as a continuous function over a preselected material level range, said method comprising the steps of:
   (a) with said probe outside of the vessel, positioning a radiation-reflecting target along said probe at a first position corresponding to a first level of the material with respect to said probe at a first end of said range,
   (b) with said target positioned in said step (a), developing and storing a first signal in said level-determining means indicative of said first level,
   (c) with the probe still outside of the vessel, positioning a target along said probe at a second position corresponding to a second level of the material with respect to the probe at a second end of said range,
   (d) with said target positioned in said step (c), developing and storing a second signal in said level-determining means indicative of said second level, and
   (e) following said steps (a)–(d), positioning said probe for operative coupling with material within the vessel.

11. The method set forth in claim 10 wherein said level-determining means comprises non-volatile digital memory, and wherein said steps (b) and (d) comprise the steps of storing digital indicia in said non-volatile memory indicative of said first and second levels.

12. The method set forth in claim 11 wherein said steps (a)–(d) are accomplished sequentially.

13. The method set forth in claim 11 wherein said steps (a) and (c) are accomplished simultaneously, and said steps (b) and (d) are accomplished simultaneously.

14. A method of calibrating a system for measuring level of material in a vessel that includes an electrically conductive probe for positioning in the vessel and means including non-volatile memory coupled to said probe for developing signals indicative of measured level of material within the vessel over a preselected material level range, said method comprising the steps of:
   (a) with said probe positioned outside of the vessel, providing target means operatively coupled to said probe for reflecting microwave radiation so as to simulate at said probe and said measuring means disposition of material level at least one end of said range, and
   (b) developing and storing at least one signal in said non-volatile memory indicative of disposition of the material level at said one end of said range, such that said measuring means is thereafter calibrated to measure material level continuously over said range with respect to said at least one end of said range.

15. The method set forth in claim 14 wherein said step (b) comprises the step of developing and storing signals in said non-volatile memory indicative of both ends of said range, at least one of said signals being derived from reflections from said target means.

16. The method set forth in claim 15 wherein said system further includes means for displaying material level as a continuous function over a preselected display range corresponding to said level range, and wherein said method comprises the additional step of coordinating said level range with said display range such that said signals indicative of both ends of said material level range correspond to displays at said display means at both ends of said display range.

* * * * *